(12) United States Patent
Nelson et al.

(10) Patent No.: US 11,525,209 B2
(45) Date of Patent: Dec. 13, 2022

(54) PREPARATION AND CHARACTERIZATION OF ORGANIC CONDUCTIVE THREADS AS NON-METALLIC ELECTRODES AND INTERCONNECTS

(71) Applicants: The Board of Regents for Oklahoma State University, Stillwater, OK (US); Allegheny-Singer Research Institute, Pittsburgh, PA (US)

(72) Inventors: Toby Larue Nelson, Stillwater, OK (US); Saadyah Averick, Pittsburgh, PA (US); Santosh Adhikari, Troy, NY (US)

(73) Assignees: The Board of Regents for Oklahoma State University, Stillwater, OK (US); Allegheny Singer Research Institute, Pittsburgh, PA (US)

( * ) Notice: Subject to any disclaimer, the term of this patent is extended or adjusted under 35 U.S.C. 154(b) by 0 days.

(21) Appl. No.: 16/646,284

(22) PCT Filed: Sep. 13, 2018

(86) PCT No.: PCT/US2018/050824
§ 371 (c)(1),
(2) Date: Mar. 11, 2020

(87) PCT Pub. No.: WO2019/055615
PCT Pub. Date: Mar. 21, 2019

(65) Prior Publication Data
US 2020/0291570 A1    Sep. 17, 2020

Related U.S. Application Data

(60) Provisional application No. 62/557,943, filed on Sep. 13, 2017.

(51) Int. Cl.
| | | |
|---|---|---|
| *D06M 11/74* | (2006.01) |
| *C08K 3/04* | (2006.01) |
| *C09D 7/20* | (2018.01) |
| *C09D 7/40* | (2018.01) |
| *C09D 5/24* | (2006.01) |
| *C09D 165/00* | (2006.01) |
| *D06M 23/08* | (2006.01) |
| *D06M 23/10* | (2006.01) |
| *H01B 1/24* | (2006.01) |
| *D06M 101/06* | (2006.01) |
| *D06M 101/12* | (2006.01) |
| *D06M 101/32* | (2006.01) |

(52) U.S. Cl.
CPC ............ *D06M 11/74* (2013.01); *C08K 3/041* (2017.05); *C09D 5/24* (2013.01); *C09D 7/20* (2018.01); *C09D 7/70* (2018.01); *C09D 165/00* (2013.01); *D06M 23/08* (2013.01); *D06M 23/10* (2013.01); *H01B 1/24* (2013.01); *C08K 2201/001* (2013.01); *C08K 2201/011* (2013.01); *D06M 2101/06* (2013.01); *D06M 2101/12* (2013.01); *D06M 2101/32* (2013.01); *D06M 2200/00* (2013.01)

(58) Field of Classification Search
CPC .......... H01B 1/12; H01B 1/24; H01B 1/127; H01M 8/00; C09D 7/70; C09D 5/24; D06M 2101/12; D06M 2101/10; D06M 2200/00
USPC ........ 428/229.1, 229.7, 300.4; 427/501, 513, 427/538, 174, 434.6, 175
See application file for complete search history.

(56) References Cited

U.S. PATENT DOCUMENTS

| | | | |
|---|---|---|---|
| 8,349,131 B1 * | 1/2013 | Agarwal .................. D21F 11/00 162/138 |
| 2005/0227059 A1 * | 10/2005 | Granstrom ............ D06M 15/59 428/292.1 |
| 2006/0052509 A1 * | 3/2006 | Saitoh ..................... C08L 65/00 524/496 |
| 2008/0170982 A1 * | 7/2008 | Zhang .................... H01L 51/444 423/447.3 |
| 2011/0304964 A1 | 12/2011 | Fleischer et al. |
| 2014/0303470 A1 * | 10/2014 | Tsukada ................... H01B 1/12 600/377 |
| 2015/0166372 A1 * | 6/2015 | Gao ....................... C02F 1/4691 204/660 |
| 2016/0079612 A1 * | 3/2016 | Kim ..................... H01M 8/0234 429/514 |
| 2016/0315380 A1 | 10/2016 | Sotzing |
| 2017/0018326 A1 | 1/2017 | Sotzing et al. |
| 2018/0248175 A1 * | 8/2018 | Ghezelbash .......... H01M 4/364 |

FOREIGN PATENT DOCUMENTS

| | | |
|---|---|---|
| KR | 1666881 | * 10/2016 |
| WO | 2012160288 A1 | 11/2012 |

\* cited by examiner

Primary Examiner — Tabassom Tadayyon Eslami
(74) Attorney, Agent, or Firm — Fox Rothschild LLP

(57) ABSTRACT

This patent document discloses a method of fabricating an electrically conductive fiber coated with polythiophene and a carbon material. The low-cost method is amenable to modifications to suit the practical needs in various applications.

15 Claims, 4 Drawing Sheets

A. rr-P3HT/SWCNTs STAINED COTTON

B. rr-P3HT/SWCNTS STAINED POLYESTER

C. rr-P3HT/SWCNTS STAINED SILK

PREPARATION AND CHARACTERIZATION OF ORGANIC CONDUCTIVE THREADS AS NON-METALLIC ELECTRODES AND INTERCONNECTS

RELATED APPLICATIONS AND CLAIM OF PRIORITY

This application is a national stage application of, and claims priority to International Patent Application No. PCT/US2018/050824, filed Sep. 13, 2018, which claims priority to U.S. Provisional Application No. 62/557,943, filed Sep. 13, 2017. The disclosures of the priority applications are fully incorporated herein by reference in their entirety.

BACKGROUND

This patent document discloses a method of making an electrically conductive fiber coated with a composite of polythiophene and carbon material. The conductive fiber can be used as non-metallic electrodes and interconnects.

Over the last few decades, electrically conductive fibers (ECFs) have been successfully used in many fields such as medical, sensors, sports, military, aerospace, wearable fabrics and energy applications. Generally, ECFs are made either from 1) intrinsically conductive materials like metals, carbon or conductive polymers or by 2) coating or embedding with electrically conductive materials on conventional insulating materials or less conductive substrates most often cotton, polyester, nylon, and silk. However, metal-based ECFs often have serious drawbacks. For example, coil-like metallic electrodes used in vagal nerve stimulation result in 10-20% incidence of vagal nerve damage. During the past few years, ECFs made from organic material (non-metallic) have emerged as an attractive and promising class of materials for realizing non-metallic interconnects for different clinical applications. This being because of their biocompatibility, better integration, ease of fabrication, light weight and limited magnetic resonance imaging problems compared to the metal involved ECFs. However, organic ECFs obtained from conductive polymer, carbon black, or by coating non-conductive fibers by conductive polymer or carbon black are either limited by their low conductivity, high cost of fabrication or reduced mechanical properties.

Thus, a need exists for improved ECFs and a production procedure that is facile, economical and scalable.

SUMMARY

Described herein are new classes of ECFs that may be fabricated with a low-cost procedure, and which may be amenable to modifications to suit the practical needs in various applications.

In some embodiments, a method of fabricating the electrically conductive fiber generally includes (a) exposing a fiber thread to a mixture comprising a polythiophene and a conductive carbon material in a solvent; and (b) removing the solvent from the fiber thread. Steps (a) and (b) can be repeated as needed to achieve a desirable coating of the fiber thread.

The fiber thread core may include a single filament thread or a multi-filament thread, each of which can be made from synthetic or natural material. Optionally, the fiber thread may have an average diameter ranging from about 1 to about 10,000 microns. In some embodiments, the fiber thread consists essentially of cotton, nylon, silk, hemp, jute, flax, ramie, sisal, or any combination thereof. In some embodiments, the fiber thread comprises a polymer selected from polylactic acids, polyglycolic acids, polylactide-co-glycolide copolymers, polytrimethylene carbonate, poly-($\varepsilon$)-caprolactone, poly-dioxanone, polyhydroxyalkanoates, polyphosphasenes, polypropylene fumarates, polyanhydrides, polyorthoesters, polyimides, polyurethanes, polyurethaneureas, perfluoroalkoxy polymers, fluorinated ethylene/propylene copolymers, polyanhydride esters, polysaccharides, polyethylene-lactone copolymers, polyethylene-polyorthoester copolymers, hydrophilic vinyl polymers, phosphoryl cholines, hydroxamates, vinyl furanones, collagen, elastin, keratin, fibrin, and blends, copolymers, homopolymers, and any combination thereof.

In some embodiments, the conductive carbon material is selected from graphene, multi-wall carbon nanotubes, single-wall carbon nanotubes, carbon black, graphite powder, fullerenes, and any combination thereof. In some embodiments, the conductive carbon material is composed of single-wall carbon nanotubes. The conductive carbon material generally may have a concentration ranging from about 0.1 mg/mL to about 5 mg/mL in the solvent. In some embodiments, the concentration of conductive carbon material ranges from about 0.7 to about 0.9 mg/mL.

In some embodiments, the polythiophene is substituted with a C1-10 alkyl substituent. One or more carbon atoms of the C1-10 alkyl substituent are optionally replaced with a heteroatom/group such as O, S, and amino-C1-5 alkyl. The C1-10 alkyl substituent can be optionally substituted with one or more substituents selected from the group consisting of OC1-5 alkyl, amino-C1-5 alkyl, SC1-5 alkyl, halogen, $NH_2$, OH, SH, C1-5 alkyl, carboxyxlic acid, trimethoxysilane, trihydroxylsilane and phosphonic acid. In some embodiments, the polythiophene contains at least one group inert to the carbon material but capable of forming a bond with the fiber core. The group is selected from the group consisting of hydroxy, amine, carboxylic acid, and thiol. In some embodiments, the polythiophene is poly(3-hexylthiophene).

The ratio of the polythiophene to the conductive carbon material may, in some embodiments, be from about 1:5 to about 5:1 by weight. In some embodiments, the ratio is about 2:1 by weight.

In some embodiments, the mixture consists essentially of the polythiophene and the conductive carbon material. In some embodiments, the mixture further includes one or more conjugated polymers selected from the group consisting of poly(pyrrole), poly(aniline), poly(acetylene), poly(p-phenylene vinylene) (PPV), poly(3,4-ethylene dioxythiophene)-poly(styrene sulfonate) (PEDOT-PSS), 3,4-alkylenedioxypyrroles, and 3,4-alkylenedioxythiophenes.

The solvent can be any organic solvent that dissolves the polythiophene. Examples include chloroform, dichloromethane, chlorobenzene, dichlorobenzene trichlorobenzene, tetrahydrofuran, toluene, NN-dimethylformamide, acetone, alcohol, ethyl acetate and any combination of these. In some embodiments, the solvent includes chloroform.

DETAILED DESCRIPTION

Figure 1:
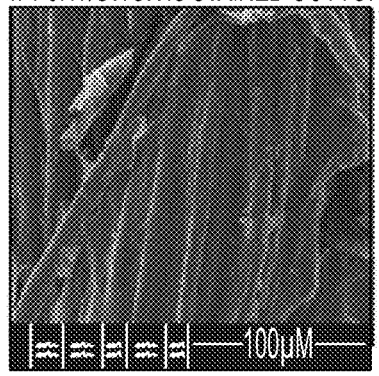
FIG. 1 illustrates scanning electron microscopy (upper) and transmission electron microscopy (lower) images of coated threads obtained after 10 dipping cycles: A) coated cotton (left); B) coated polyester (center); and C) coated silk (right).
Figure 1:
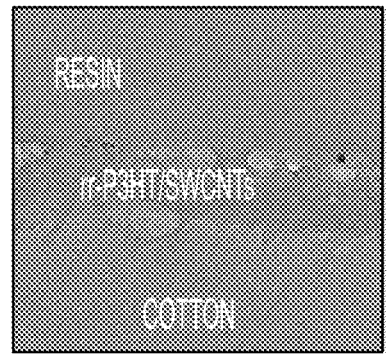
Figure 1:
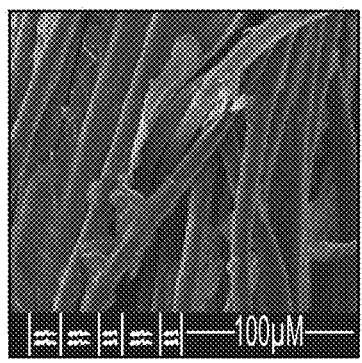
Figure 1:
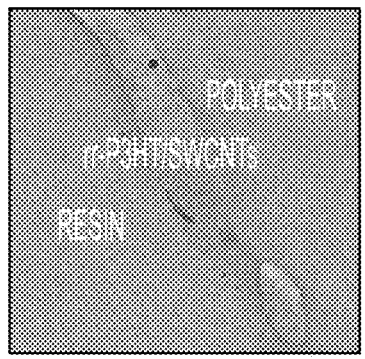
Figure 1:
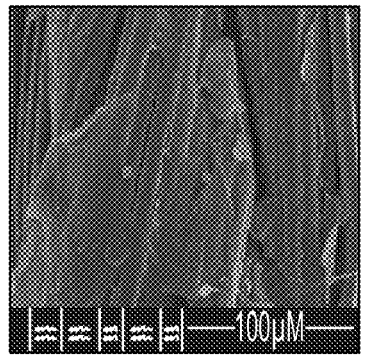
Figure 1:
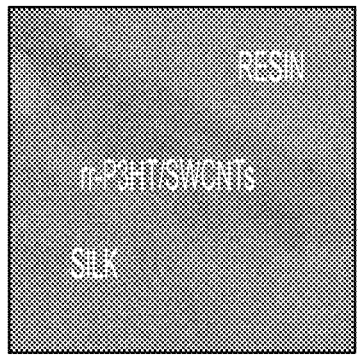

This document discloses electrically conductive organic fibers containing a fiber core coated with two intrinsically conductive materials. In comparison with conventional fibers, the fibers disclosed in this document may be lighter, more flexible, and highly conductive. In addition, the fibers described herein can be fabricated with biocompatible materials, which can help lower the cost of fabrication. Further, the ease of adaptability may allow the fibers to be used for various applications such as medical applications, sensors, sports, military, aerospace, wearable fabrics and energy applications.

While the following text may reference or exemplify specific embodiments of a conductive fiber or a method of fabricating the fiber, it is not intended to limit the scope of the invention to such particular reference or examples. Various modifications may be made by those skilled in the art, in view of practical and economic considerations, such as the amount of the carbon material in the fiber and its ratio relative to the conductive polymer.

The articles "a" and "an" as used herein refers to "one or more" or "at least one," unless otherwise indicated. That is, a reference to any element or component of the present invention by the indefinite article "a" or "an" does not exclude the possibility that more than one element or component is present.

The term "about" as used herein refers to the referenced numeric indication plus or minus 10% of that referenced numeric indication.

A method of fabricating the novel electrically conductive fibers (ECFs) generally includes (a) exposing a fiber thread to a mixture comprising a polythiophene and a conductive carbon material in a solvent; and (b) removing the solvent from the fiber thread.

The sequence of steps (a) and (b) can be repeated to ensure the coating and the conductivity of the fiber thread. In some embodiments, steps (a) and (b) are repeated until the isolated conductive fiber after removing the solvent exhibits an electrical resistivity of less than about 2, less than about 1, less than about 0.8, less than about 0.7, less than about 0.6, less than about 0.5, less than about 0.4, less than about 0.3, less than about 0.2, or less than about 0.1 ohm·cm.

Any means of exposing the fiber thread to the mixture can be practiced as long as a desirable coating is achieved. For example, the fiber thread core can be submerged into the mixture for an extended period of time while the mixture in the solvent is agitated to maximize the physical interaction between the components of the mixture and the thread. Alternatively, the mixture can be sprayed as a solution or suspension to the thread. The spraying and solvent removal can be repeated multiple times to ensure a desirable coating and conductivity.

Each of the polythiophene and the conductive carbon material in the mixture can be partially or completely dissolved in the solvent. In cases of a partial dissolution of one or both of these components, a uniform suspension is desirable for coating the fiber thread core. Various known techniques such as shaking, sonicating can be used to mix the polythiophene and the conductive carbon material uniformly in the solvent. Heating or microwaving can also be applied to facilitate the even distribution of the components in the solvent. In some embodiments, at least the polythiophene is substantially dissolved in the solvent. While the fabrication typically involves applying the polythiophene and the conductive carbon as a mixture to the fiber thread core, the polythiophene and the conductive carbon can be sequentially coated onto the thread. For example, the fiber thread can be exposed to a solution of the polythiophene and a suspension of the conductive carbon in separate steps, which if necessary are repeated multiple times.

Optionally, the polythiophene may be soluble in the solvent, which can be for example, chloroform, dichloromethane, chlorobenzene, dichlorobenzene trichlorobenzene, tetrahydrofuran, toluene, N,N-dimethylformamide, acetone, alcohol, ethyl acetate and any combination of these. Removal of the solvent from the coated fiber thread can be accomplished by for example, heating, air drying, vacuuming, or any combination of these processes.

The ratio between the polythiophene and the conductive carbon material has a significant impact on the conductivity of the resulting fiber. The ratio of the polythiophene to the conductive carbon material by weight in the mixture may, in some embodiments ranges from about 1:20 to about 20:1 by weight, all subranges included. Examples of the ratio include about 1:8, 1:6, 1:4, 1:2, 1:1, 2:1, 4:1, 6:1, and 8:1.

The concentration of the individual components of the coating mixture in the solvent may impact the conductivity of the final product. Generally, the carbon material has a concentration in the solvent ranging between about 0.1 mg/mL and about 5 mg/mL, between about 0.1 mg/mL and about 2 mg/mL, between about 0.3 mg/mL and about 1.5 mg/mL, between about 0.5 mg/mL and about 1.0 mg/mL, between about 0.7 mg/mL and about 0.9 mg/mL in a solvent or suspension system. Due to its low solubility in the organic solvent, the carbon material such as graphite may be finely milled for uniform distribution as a suspension in the solvent. Non-limiting examples of the concentration in the solvent includes about 0.2, about 0.4, about 0.6, about 0.8, about 1.0, about 1.2, about 1.4, about 1.6, about 2.0, about 3.0, and about 4.0 mg/mL. In some embodiments, the carbon material is single wall carbon nanotubes. The method allows for fabrication of the organic conductive fibers with comparatively less resistivity using much fewer amounts of single walled carbon nanotubes than what has been reported in the literature while also retaining good mechanical properties to be used for a variety of applications. In some embodiments, the conductive fiber prepared under the above described condition exhibits a resistivity of less than about 2, less than about 1, less than about 0.8, less than about 0.7, less than about 0.6, less than about 0.5, less than about 0.4, less than about 0.3, less than about 0.2, or less than about 0.1 ohm·cm.

The fiber thread can be made from synthetic or natural materials. In some embodiments, the fiber thread consists of a single filament fiber thread. In some embodiments, the fiber core consists of multi-filament fiber thread, which may be made from fibers spun, woven, knitted, crocheted, knotted, pressed, plied, or the like from multiple filaments.

The material for the fiber thread core can be doped with a metal. Examples of electrically conductive metals that can be used as a dopant include silver, copper, gold, iron, aluminum, zinc, nickel, tin, and combinations comprising at least one of the foregoing metals. Iron and iron alloys such as stainless steel (an alloy of carbon, iron, and chromium) can also be used.

In some embodiments, the fiber thread core consists of one or more non-conductive materials, and has an electrical resistance of more than about 10, more than about 20, or more than about 50, or more than about 100 kohm/cm. Non-limiting examples of such non-conductive materials include natural materials (e.g., cotton, silk, hemp, jute, flax, ramie, sisal, hair, fur, and wool) and synthetic organic polymers (e.g., poly(amide) (nylon), poly(ethylene), poly (ester), poly(acrylic), polyurethane (spandex), poly(lactide), and the like). In some embodiments, the fiber core contains one or more polymers selected from polylactic acids, polyglycolic acids, polylactide-co-glycolide copolymers, polytri-methylene carbonate, poly-(ε)}-caprolactone, poly-dioxanone, polyhydroxyalkanoates, poly-phosphasenes, polypropylene fumarates, polyanhydrides, polyorthoesters, polyimides, poly-urethanes, polyurethaneureas, perfluoro-alkoxy polymers, florinated ethylene/propylene co-polymers, polyanhydride esters, polysaccharides, polyethylene-lactone copolymers, poly-ethylene-polyorthoester copolymers, hydrophilic vinyl polymers, phosphoryl cho-lines, hydroxamates, vinyl furanones, collagen, elastin, kera-tin, fibrin, and blends, copolymers, homopolymers, and combinations thereof.

As mentioned above, a single filament can be woven, knitted, crocheted, knotted, pressed, or plied to form a multi-filament fiber thread. It is also expressly contemplated to have multiple nonconductive fibers formed into a yarn, and then used alone or in combination with a conductive material in the fiber thread core.

The length and diameter of the fiber thread core depend on the intended use and the specific composition of the overall conductive fiber. In some embodiments, the diameter of the fiber thread may be in a range from about 1 to about 10,000 microns, from about 1 to about 1,000 microns, from about 1 to about 100 microns, from about 50 to about 500 microns, from about 100 to about 400 microns, from about 100 to about 300 microns, from about 200 to about 300 microns, from about 200 to about 300 microns, from about 0.1 to about 20 microns, from about 0.5 to about 20 microns, from about 1 to about 15 microns, from about 1 to about 10 microns, or from about 1 to about 5 microns.

In some embodiments, the fiber thread core consists of one or more non-conductive materials and the coating comprises a carbon material and a polythiophene. In some embodiments, the fiber thread core consist of a non-conduc-tive material and the mixture consists essentially of a carbon material and a polythiophene.

The conductive carbon material generally has a resistivity of less than about 20, less than about 10, less than about 5, or less than about 1 kohm·cm. Non-limiting examples include graphene, multi-wall carbon nanotubes, single-wall carbon nanotubes, carbon black, graphite powder, fuller-enes, and any combination thereof. In some embodiments, the conductive carbon material consists essentially of single-wall carbon nanotubes.

The polythiophene in the coating can be substituted or unsubstituted. In some embodiments, the polythiophene is substituted with a C1-10 alkyl substituent. One or more carbon atoms of the C1-10 alkyl substituent are optionally replaced with a heteroatom/group selected from O, S, and amino-C1-5 alkyl. Meanwhile, the C1-10 alkyl substituent is optionally substituted with one or more substituents selected from the group consisting of OC1-5 alkyl, amino-C1-5 alkyl, SC1-5 alkyl, halogen, NH2, OH, SH, C1-5 alkyl, carboxyxlic acid, and perfluoroalkyl. In some embodiments, the polythiophene is poly(3-hexylthiophene). A "C1-10 alkyl substituent" refers to an alkyl substituent, which can have 1, 2, 3, 4, 5, 6, 7, 8, 9, or 10 carbons. Similarly, a "C1-5 alkyl substituent" can have any number of carbons from 1 to 5, inclusive.

In some embodiments, the substituents of the polythio-phene are inert to the carbon material but are reactive enough to interact with a chemical group on the fiber core. Such interaction can be through, for example, van der Waals forces, hydrogen bonding, ionic interaction, or the formation of a covalent bond. In some embodiments, the polythio-phene contain one or more substituents or groups selected from the substituents of hydroxy, amine, amide, carboxylic acid, thiol, sulfonate, and perfluoroalkyl which are capable of forming a bond with a chemical group on the material of the fiber core. Similarly, the fiber core can contain one or more functional groups selected from hydroxy, amine, amide carboxylic acid, thiol, sulfonate, and perfluoroalkyl.

The coating mixture and/or fiber thread can each inde-pendently further include one or more additional conductive polymers such as conjugated polymers. Non-limiting examples include poly(pyrrole), poly(aniline), poly(acety-lene), poly(p-phenylene vinylene) (PPV), poly(3,4-ethylene dioxythiophene)-poly(styrene sulfonate) (PEDOT-PSS), and the like.

In some embodiments, the coating mixture consists essen-tially of the poly(3-hexylthiophene) and single wall carbon nanotubes. In some embodiment, the poly(3-hexylthi-ophene) and single wall carbon nanotubes are in a ratio of about 2:1 by weight in the mixture.

A related aspect of this disclosure provides an electrically conductive fiber fabricated according to the methods described herein. Due to its biocompatibility, better integra-tion, ease of fabrication, light weight and limited magnetic resonance imaging problems compared to the metal involved ECFs, it may be able to be used in various fields such as medical applications, sensors, sports, military, aero-space, wearable fabrics and energy applications.

EXAMPLE 1

Materials and Instrumentations: Regioregular poly(3-hex-ylthiophene) rr-P3HT was synthesized using the previously reported procedure. Single-walled carbon nanotubes (SWCNTs, purity >95%) was purchased from Aldrich. The resistance measurements were characterized using a thread measuring apparatus connected to a multimeter. Scanning electron microscopy (SEM) was used to investigate the morphology of the uncoated and coated threads. The mor-phology of the threads was probed with an FEI Quanta 600 SEM with Evex EDS system (FEI, Hillsboro, Oreg.). The SEM samples were prepared by mounting a piece of coated thread on an aluminum stub. Samples were then coated with a very thin layer of palladium/gold metal deposited using a MED 010 sputter coater (Balzers, Oberkochen, Germany) to make them conductive. The mechanical strength of the conductive threads was characterized by means of stress-strain measurements performed on a TA instrument DMA Q800. The stress applied varied from 0 to 18 N with the linear ramp force 1.00 N/min Strain was expressed as percentage elongation with respect to the sample's original length.

Method of Fabrication: The conductive ink was prepared by dispersing single-walled carbon nanotubes (SWCNTs) into chloroform using regioregular poly(3-hexylthiophene) (rr-P3HT). The preparation of the conductive ink began by adding SWCNTs to the rr-P3HT solution in CHCl3. The resulting mixture was ultrahigh sonicated for 30 minutes maintaining a temperature of 0° C. A dipping and drying technique was utilized to coat the thread with the conductive ink. After coating, the threads were oven dried for 15 minutes at 100° C.

Optimization of Number of Dipping Cycles, SWCNTs to P3HT Ratio and Concentration of SWCNTs: Cotton threads were used for all of these optimization. The cotton thread was completely submersed into the conductive ink and then oven dried. The resistivity was then measured using our thread measuring apparatus attached to a multimeter. This process was repeated 20 times and the resistivity data was plotted against the number of dipping cycles. The cotton threads were found to be conductive after one dipping and drying cycle. The cotton thread became less resistant with the number of dipping cycles however after 10 dipping cycles, the resistance of the thread remained constant at 0.45 kohm/cm.

To optimize the concentration of the SWCNTs, three different concentrations of SWCNTs (0.5 mg/mL, 0.8 mg/mL and 1.2 mg/mL) were used to prepare the conductive ink while keeping the SWCNT:P3HT ratio the same (1:2). It was found that 0.8 mg/mL of SWCNTs yield the lowest of 0.45 kiloOhm/cm. The resistance of the threads was found to increase with both increased and decreased SWCNT concentration.

TABLE 1

Electrical resistance of the coated cotton obtained by varying concentration of SWCNTs keeping the SWCNT:P3HT ratio same.

| SWCNT:P3HT | Concentration of SWCNT | Resistance (kohm/cm) |
| --- | --- | --- |
| 1:2 | 0.5 mg/mL | 0.90 |
| 1:2 | 0.8 mg/mL | 0.45 |
| 1:2 | 1.2 mg/mL | 1.02 |

Once the concentration of SWCNTs was optimized, then the ratio of the SWCNT to P3HT was investigated by keeping the concentration SWCNTs constant (0.8 mg/mL). It was found that 1:2 ratio of SWCNT to P3HT provide the lowest resistance.

TABLE 2

Electrical resistance of the coated cotton obtained by changing the SWCNT:P3HT ratio keeping the concentration of SWCNTs same.

| SWCNT:P3HT | Concentration of SWCNT | Resistance (kohm/cm) |
| --- | --- | --- |
| 1:1 | 0.8 mg/mL | 0.54 |
| 1:2 | 0.8 mg/mL | 0.45 |
| 1:3 | 0.8 mg/mL | 0.76 |

After the optimization of number of dipping cycles, ratio of SWCNT to P3HT and concentration of SWCNT, the optimized conditions were used for further fabrication of all the organic conductive threads.

Characterization of Organic Conductive Threads: Three different organic threads made from cotton, silk and polyester (both natural and synthetic organic threads) were used to fabricate the organic conductive threads using the optimized conditions. Each conductive thread was then characterized by electrical measurements, scanning electron microscopy (SEM), Transmission electron microscopy (TEM) stress-strain measurements and Raman spectroscopy.

Figure 2:
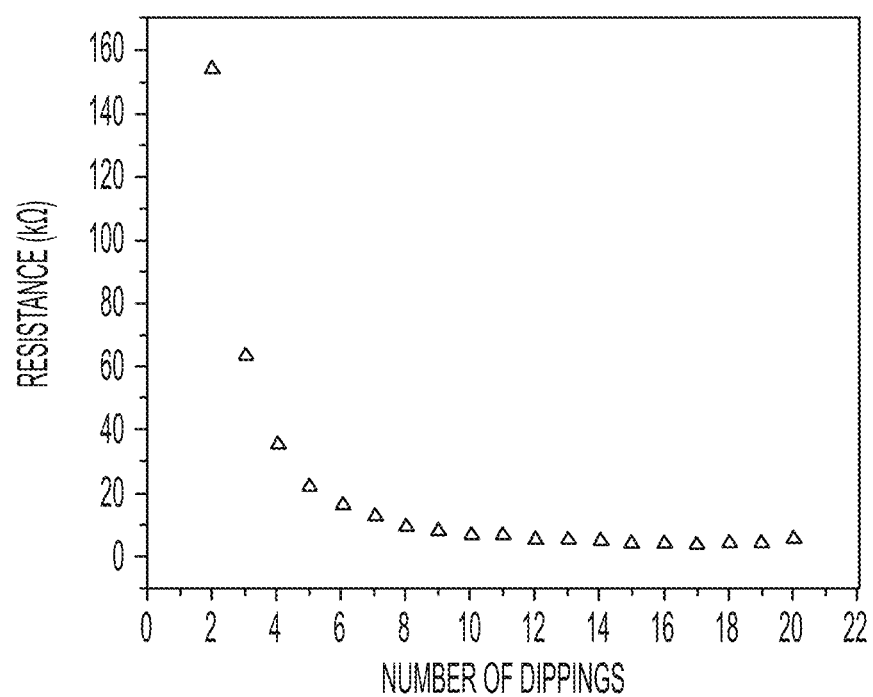
FIG. 2 illustrates the correlation between conductive fiber resistance and the number of dip coating procedures used in its preparation.

Electrical measurements: The resistance of the conductive organic threads was measured by using a thread measuring apparatus attached to a multimeter (FIG. 2). The resistances of the uncoated threads were too high to be measured by the given apparatus. The results are shown in Table 3.

TABLE 3

Electrical resistance of the three different coated threads

| Sample (Coated Samples) | Resistance* |
| --- | --- |
| SA-22-77-Cotton | 0.50 kohm/cm |
| SA-22-77-Silk | 0.65 kohm/cm |
| SA-22-77-Polyester | 0.73 kohm/cm |

*The data shows the average of three different conductive threads of each type.

The morphology of the three conductive threads was observed by scanning electron microscopy (upper images in FIG. 1) and the coated threads obtained after 10 dipping cycles. It is clearly seen on the SEM images that the conductive composite has covered the exterior of every strand of each thread and has also filled the gap between strands. Also observed was an increase in diameter of the coated cotton and silk threads with conductive composite but a slight decrease in the case of polyester TEM images of the materials (Lower images in FIG. 1) provide further evidence of the presence of SWCNTs on the surface of the underlying fiber. TEM images in FIG. 4 clearly show the stained region on each type of fibers and also show the presence of carbon nanotubes which appeared as darker spots on the stained region.

Figure 3:
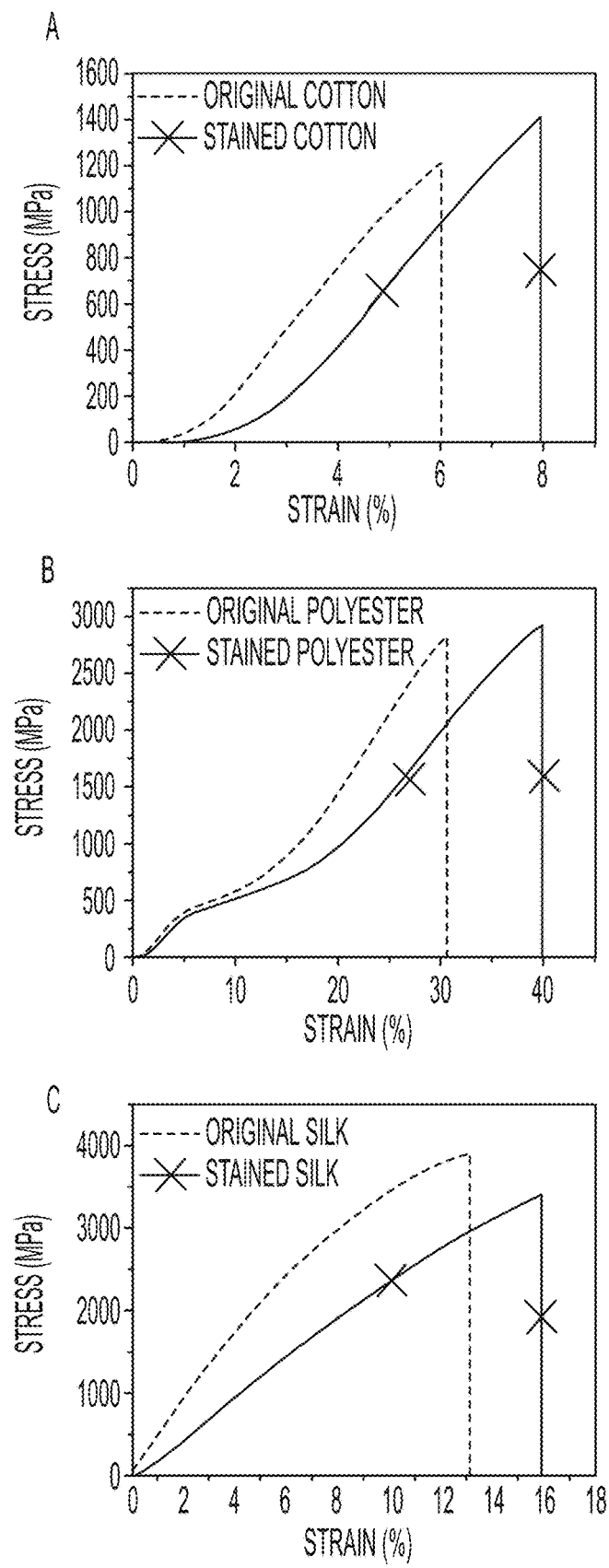
FIG. 3 illustrates stress-strain plots for: A) original and coated cotton, B) original and coated polyester and C) original and coated silk.

Stress-strain measurements: The mechanical strength of the conductive threads was characterized by means of stress-strain measurements performed using a TA instrument DMA Q800. Mechanical parameters: Young's modulus; ultimate breaking stress; and elongation at break were acquired using 3 different fibers of the same type and the mean values of the parameters for all original and coated threads are reported in Table 4. Stress-strain plots are shown in FIG. 3.

TABLE 4

Mechanical data of the coated threads

| Samples | Young's Modulus (MPa) | Ultimate Breaking Stress (MPa) | Elongation at Break Point (%) |
| --- | --- | --- | --- |
| Original Cotton | 296 ± 36 | 1214 ± 173 | 6.0 ± 0.3 |
| Coated Cotton | 257 ± 17 | 1402 ± 30 | 7.9 ± 0.2 |
| Original Silk | 305 ± 32 | 3920 ± 34 | 13.1 ± 0.9 |
| Coated Silk | 241 ± 23 | 3414 ± 69 | 15.9 ± 0.3 |
| Original Polyester | 127 ± 10 | 2833 ± 127 | 30.7 ± 0.5 |
| Coated Polyester | 76 ± 4 | 2915 ± 289 | 40.0 ± 1.3 |

Based on the data, two main observations were made. First, the maximum elongation of the material before breaking was found to increase in the coated fibers compared to the original, uncoated material. This indicates that the main mechanical property of interest, such as flexibility, for evaluating the ability of the fiber to be woven or knitted was preserved in the coated fibers.

Second, we observed a decrease in Young's modulus for each coated fiber, indicating that the conductive composite coating decreased the stiffness of the thread. This property of the modified fibers may be attributed to a lubricant effect of the coating assembly that seems to enable fiber strands to more easily slide on one another following the application of a mechanical stimulus.

These results indicate that the coated threads are more flexible and less stiff than their original counterparts. However, these coated threads still possess the mechanical properties of interest for their ability to be woven or knotted for their application in making smart fabrics and in non-metallic interconnects for clinical applications.

Figure 4:
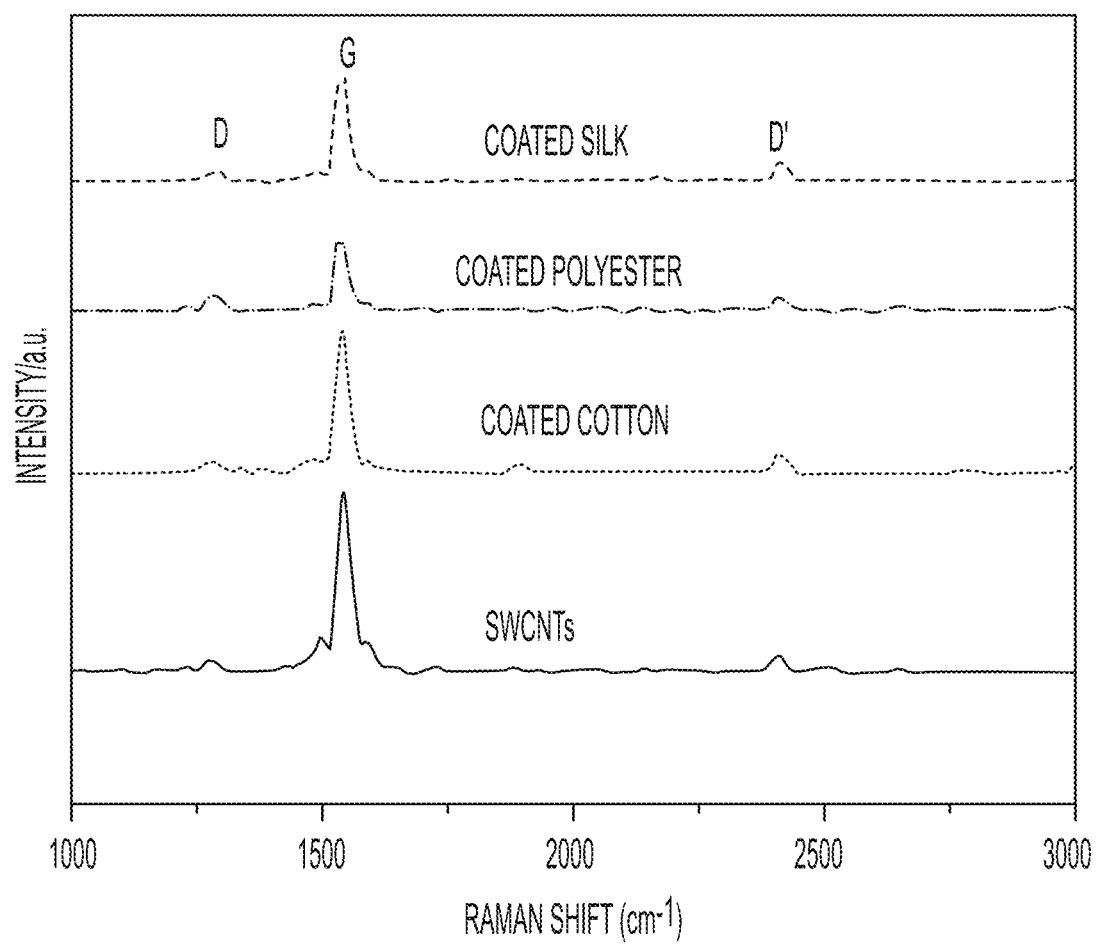
FIG. 4 compares Raman spectra of single wall carbon nanotubes to those of modified threads, illustrating the presence of carbon on the fibers.

In order to provide further evidence for the presence of SWCNTs in the conductive polymers, the resulting fibers were examined using Raman spectroscopy. Raman spectra of the three organic conductive threads and SWCNTs are shown in FIG. 4. The characteristic D-band (~1277 cm−1) and G-band (~1540 cm−1) for SWCNTs can be clearly observed on all the three organic ECFs. Additionally, second order band (~2407cm−1) is also clearly identified in all the organic ECFs, implying the presence of SWCNTs in all coated fibers.

EXAMPLE 2

When poly(3-hexylthiophene) rr-P3HT/SW-CNT conductive silk, cotton, and polyester fibers (~0.2 mm) were used to measure electrocardiogram (EKG) and electromyography (EMG), signals were observable. No signal was seen when uncoated silk, cotton, or polyester was used (signal read as open circuit). The fibers can be used either on the skin or implanted.

The resistivity and conductivity of the organic conductive fibers were measured by passing a charge through the fibers from a calibrated current source and the voltage was measured on an oscilloscope.

TABLE 5 resistivity and conductivity of the organic conductive fibers

| R (ohms) | L (cm) | diameter (cm) | radius (cm) | $r^2$ ($cm^2$) | A ($cm^2$) | ρ (ohm · cm) | σ (S/cm) |
|---|---|---|---|---|---|---|---|
| SA-22-77-Cotton | | | | | | | |
| 6170 | 10 | 0.0236 | 0.0118 | 0.0001392 | 0.0004374 | 0.269898 | 3.705 |
| 6000 | 10 | 0.0236 | 0.0118 | 0.0001392 | 0.0004374 | 0.262461 | 3.810 |
| 6100 | 10 | 0.0236 | 0.0118 | 0.0001392 | 0.0004374 | 0.266836 | 3.747 |
| 6000 | 10 | 0.0236 | 0.0118 | 0.0001392 | 0.0004374 | 0.262461 | 3.810 |
| SA-22-77-Polyester | | | | | | | |
| 13280 | 10 | 0.0237 | 0.01185 | 0.0001404 | 0.0004412 | 0.585848 | 1.706 |
| 13050 | 10 | 0.0237 | 0.01185 | 0.0001404 | 0.0004412 | 0.575701 | 1.737 |
| 12660 | 10 | 0.0237 | 0.01185 | 0.0001404 | 0.0004412 | 0.558496 | 1.790 |
| 12500 | 10 | 0.0237 | 0.01185 | 0.0001404 | 0.0004412 | 0.551438 | 1.813 |
| SA-22-77-Silk | | | | | | | |
| 14690 | 10 | 0.02309 | 0.011545 | 0.0001333 | 0.0004187 | 0.615120 | 1.625 |
| 14770 | 10 | 0.02309 | 0.011545 | 0.0001333 | 0.0004187 | 0.618469 | 1.616 |
| 14690 | 10 | 0.02309 | 0.011545 | 0.0001333 | 0.0004187 | 0.615120 | 1.625 |
| 14530 | 10 | 0.02309 | 0.011545 | 0.0001333 | 0.0004187 | 0.608419 | 1.643 |

*Resistance R (ohms)
Length of the thread L (cm)
Diameter of the thread (from SEM image)
Radius of the thread r (cm)
Cross sectional Area A (A = $\pi r2$, cm2)
Resistivity = Resistance X Area/length (ρ = RA/L)
Electrical conductivity = 1/ρ
* The resistivity for each of uncoated cotton, uncoated polyester and uncoated silk is too high to measure. When I is 1 mA, V is greater than 60 volts. R is thus greater than 6 kohm/cm.

It will be appreciated by persons skilled in the art that the present invention is not limited to what has been particularly shown and described. Rather, the scope of the present invention is defined by the claims which follow. It should further be understood that the above description is only representative of illustrative examples of embodiments. The description has not attempted to exhaustively enumerate all possible variations. The alternate embodiments may not have been presented for a specific portion of the invention, and may result from a different combination of described portions, or that other un-described alternate embodiments may be available for a portion, is not to be considered a disclaimer of those alternate embodiments. It will be appreciated that many of those un-described embodiments are within the literal scope of the following claims, and others are equivalent.

The invention claimed is:

1. A method of fabricating an electrically conductive fiber, wherein the fiber thread comprises a nonconductive synthetic or natural polymer, having an electrical resistance of less than about 0.8 kohm/cm, comprising;
   (a) exposing a fiber thread to a mixture comprising a polythiophene and a conductive carbon material in a solvent, wherein the polythiophene is regioregular poly (3-hexylthiophene) soluble in the solvent, and wherein the concentration of the carbon material and the ratio between the regioregular poly(3-hexylthiophene) and the carbon material are selected so that the electrical resistance of the conductive fiber is less than about 0.8 kohm/cm, wherein the ratio between the regioregular poly(3-hexylthiophene) and the conductive carbon material is selected from a range of from about 3:1 to about 1:1 by weight, wherein the carbon material consists essentially of single-wall carbon nanotubes; and
   (b) removing the solvent from the fiber thread to yield a conductive fiber, and wherein the electrically conductive fiber is free from poly (3,4-ethylene dioxythiophene)-poly (styrene sulfonate) (PEDOT-PSS).

2. The method of claim 1, further comprising repeating steps (a) and (b).

3. The method of claim 1, wherein the fiber thread is a single filament fiber thread.

4. The method of claim 1, wherein the fiber thread is multi-filament thread.

5. The method of claim 1, wherein the fiber thread consists essentially of cotton, nylon, silk, hemp, jute, flax, ramie, sisal, wool, or any combination thereof.

6. The method of claim 1, wherein the fiber thread comprises a polymer selected from the group consisting of polylactic acids, polyglycolic acids, polylactide-co-glycolide copolymers, polytrimethylene carbonate, poly-($\varepsilon$)-caprolactone, poly-dioxanone, polyhydroxyalkanoates, polyphosphasenes, polypropylene fumarates, polyanhydrides, polyorthoesters, polyimides, polyurethanes, polyurethaneureas, perfluoroalkoxy polymers, florinated ethylene/propylene copolymers, polyanhydride esters, polysaccharides, polyethylene-lactone copolymers, polyethylene-polyorthoester copolymers, hydrophilic vinyl polymers, phosphoryl cholines, hydroxamates, vinyl furanones, collagen, elastin, keratin, fibrin, and blends, copolymers, homopolymers, and any combination thereof.

7. The method of claim 1, wherein the fiber thread has an average diameter of from about 1 to about 10,000 microns.

8. The method of claim 1, wherein the carbon material has a concentration in the solvent ranging from about 0.7 to about 0.9 mg/mL.

9. The method of claim 1, wherein the fiber thread comprises one or more second groups selected from the group consisting of hydroxyl, amine, carboxylic, thiol, hydroxy, amine, amide, carboxylic acid, thiol, perfluoroalkyl, phosphonic acid and sulfonic acid.

10. The method of claim 1, wherein a ratio of the polythiophene to the conductive carbon material is about 2:1 by weight.

11. The method of claim 1, wherein the mixture further comprises one or more conjugated polymers selected from the group consisting of poly(pyrrole), poly(aniline), poly (acetylene), and poly (p-phenylene vinylene) (PPV).

12. The method of claim 1, wherein the solvent is selected from the group consisting of chloroform, dichloromethane, chlorobenzene, dichlorobenzene trichlorobenzene, tetrahydrofuran, toluene, N,N-dimethylformamide, and any combination thereof.

13. The method of claim 1, wherein the solvent is chloroform.

14. An electrically conductive fiber fabricated according the method of claim 1.

15. The method of claim 1, wherein the carbon material has a concentration in the solvent of 0.8 mg/mL.

\* \* \* \* \*